US012197575B2

(12) United States Patent
Sims et al.

(10) Patent No.: US 12,197,575 B2
(45) Date of Patent: Jan. 14, 2025

(54) DETECTION, ISOLATION, AND MITIGATION OF ATTACKS ON A FILE SYSTEM

(71) Applicant: Alchemi Data Management, Inc., Friday Harbor, WA (US)

(72) Inventors: Robert Charles Sims, Round Rock, TX (US); Peter Anthony DeLine, Round Rock, TX (US); Michael Randolph Jones, Friday Harbor, WA (US)

(73) Assignee: Alchemi Data Management, Inc., Friday Harbor, WA (US)

( * ) Notice: Subject to any disclaimer, the term of this patent is extended or adjusted under 35 U.S.C. 154(b) by 247 days.

(21) Appl. No.: 17/895,527

(22) Filed: Aug. 25, 2022

(65) Prior Publication Data

US 2023/0137747 A1  May 4, 2023

Related U.S. Application Data

(60) Provisional application No. 63/273,024, filed on Oct. 28, 2021.

(51) Int. Cl.
*G08B 23/00* (2006.01)
*G06F 11/00* (2006.01)
*G06F 11/30* (2006.01)
*G06F 16/182* (2019.01)
*G06F 21/56* (2013.01)

(52) U.S. Cl.
CPC ...... *G06F 21/566* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 9,275,065 B1 | 3/2016 | Ganesh et al. | |
| 9,928,365 B1 * | 3/2018 | Anderson | G06F 21/552 |
| 10,505,959 B1 | 12/2019 | Wang et al. | |
| 2017/0061123 A1 * | 3/2017 | Parker-Wood | G06F 21/556 |
| 2018/0359272 A1 | 12/2018 | Mizrachi et al. | |
| 2020/0028912 A1 * | 1/2020 | Vermeulen | H04L 67/1097 |
| 2020/0106797 A1 * | 4/2020 | Christian | H04L 63/1483 |
| 2020/0250305 A1 * | 8/2020 | Pendyala | G06N 20/20 |
| 2020/0302074 A1 * | 9/2020 | Little | G06F 21/6218 |
| 2021/0049277 A1 * | 2/2021 | Mueller-Wicke | G06F 21/568 |

FOREIGN PATENT DOCUMENTS

JP   2019067065 A  *  4/2019

* cited by examiner

*Primary Examiner* — Christopher B Robinson
(74) *Attorney, Agent, or Firm* — Brian F. Russell

(57) ABSTRACT

Techniques are disclosed to detect, isolate, and/or mitigate an attack on a file system, for example, by malicious software, human actors, and/or compromised Internet-connected devices (bots). A processor of a data processing system detects an abnormal file system access pattern to a file system by applying statistical process control to network layer packets. Based on detecting the abnormal file system access pattern, the processor temporarily suspends file system access by at least one user ID contributing to the abnormal file system access pattern. The processor provides a notification identifying one or more file system object accessed in the abnormal file system access pattern.

23 Claims, 5 Drawing Sheets

DETECTION, ISOLATION, AND MITIGATION OF ATTACKS ON A FILE SYSTEM

BACKGROUND OF THE INVENTION

The present invention relates generally to data processing and, in particular, to detection, isolation, and mitigation of attacks on a file system, for example, by malicious software, human actors, and/or compromised Internet-connected devices (bots).

A chief concern in the design and operation of individual data processing systems and enterprise information technology (IT) infrastructure is data security. As is well-known in the art, individual data processing systems and data processing systems within enterprises are frequently subject to attack by malicious software (malware), such as viruses and ransomware.

A computer virus is malware that modifies the manner in which a computer operates and is designed to spread from one computer to another. A virus commonly inserts or attaches itself to a legitimate program or a document supporting macros in order to execute its code. In the process, a virus has the potential to cause unexpected or damaging effects, such as corrupting or destroying data and software.

Ransomware is another type of malware that threatens to block access to data or a computer system (usually by encrypting files) or to publish data unless the victim pays a ransom to the ransomware attacker. Often, the ransomware demand stipulates a deadline for payment that, if not met, results in the permanent unavailability or publication of the data.

Individual data processing systems and enterprise IT infrastructure are also subject to attack by human actors (e.g., disgruntled employees, corporate spies, etc.) and bots. In these attacks, the attackers may seek to steal intellectual property, discover and/or divulge trade secrets and/or other sensitive information, create an unauthorized file dump, etc.

Conventional techniques for addressing the security challenges presented by malware, human actors, and bots have limitations. For example, status-based techniques monitor for certain system changes at regular time intervals as evidence of possible unauthorized activity. However, these status-based techniques do not operate in real time and thus do not provide rapid notification of an attack on a file system. Further, status-based systems for enterprise intrusion detection do not typically identify the user(s) affected (and/or infected) by a malware attack. Signature-based malware detection is similarly limited in that malware can evade detection by employing a novel signature (hash). Signature-based malware detection can also adversely impact performance due to the computational load imposed by malware detection and the occurrence of false positive detections. Signature-based malware detection is also generally ineffective against attacks by human and bot actors.

BRIEF SUMMARY

The various embodiments of the disclosed inventions enable a data processing system to detect, isolate, and mitigate attacks on a file system. Aspects of the disclosed inventions can be implemented as a method, a data processing system, and a program product.

In at least one embodiment, a processor of a data processing system detects an abnormal file access pattern in a file system by applying statistical process control. The abnormal file access pattern can be detected based on network-layer traffic (i.e., packets) including commands implying various types of access to file system objects. Based on detecting the abnormal file access pattern, the processor temporarily suspends file system access associated with at least one user identifier (ID) contributing to the abnormal file system access pattern. The processor provides a notification identifying one or more users and/or associated file system objects accessed in the abnormal file system access pattern.

In at least some embodiments, applying statistical process control includes setting one or more file access limits for one or more user IDs. In at least some embodiment, these one or more file access limits are set based on an observed number of file system accesses associated with the one or more user IDs during each observation interval in an observation period. The one or more file access limits may be periodically updated based on changing file system access patterns associated with the one or more user IDs.

In at least some embodiments, applying statistical process control includes building a file access index based on file system access requests of one or more users.

In at least some embodiments, based on detecting the abnormal file system access pattern, the processor can also temporarily suspend file system access to one or more file system objects recently accessed by at least one user ID contributing to the abnormal file system access pattern.

In at least some embodiments, based on detecting the abnormal file system access pattern, the processor recovers at least one recently accessed file system object in the abnormal file system access pattern by reverting to a prior version of at least one file system object.

DETAILED DESCRIPTION

Figure 1:
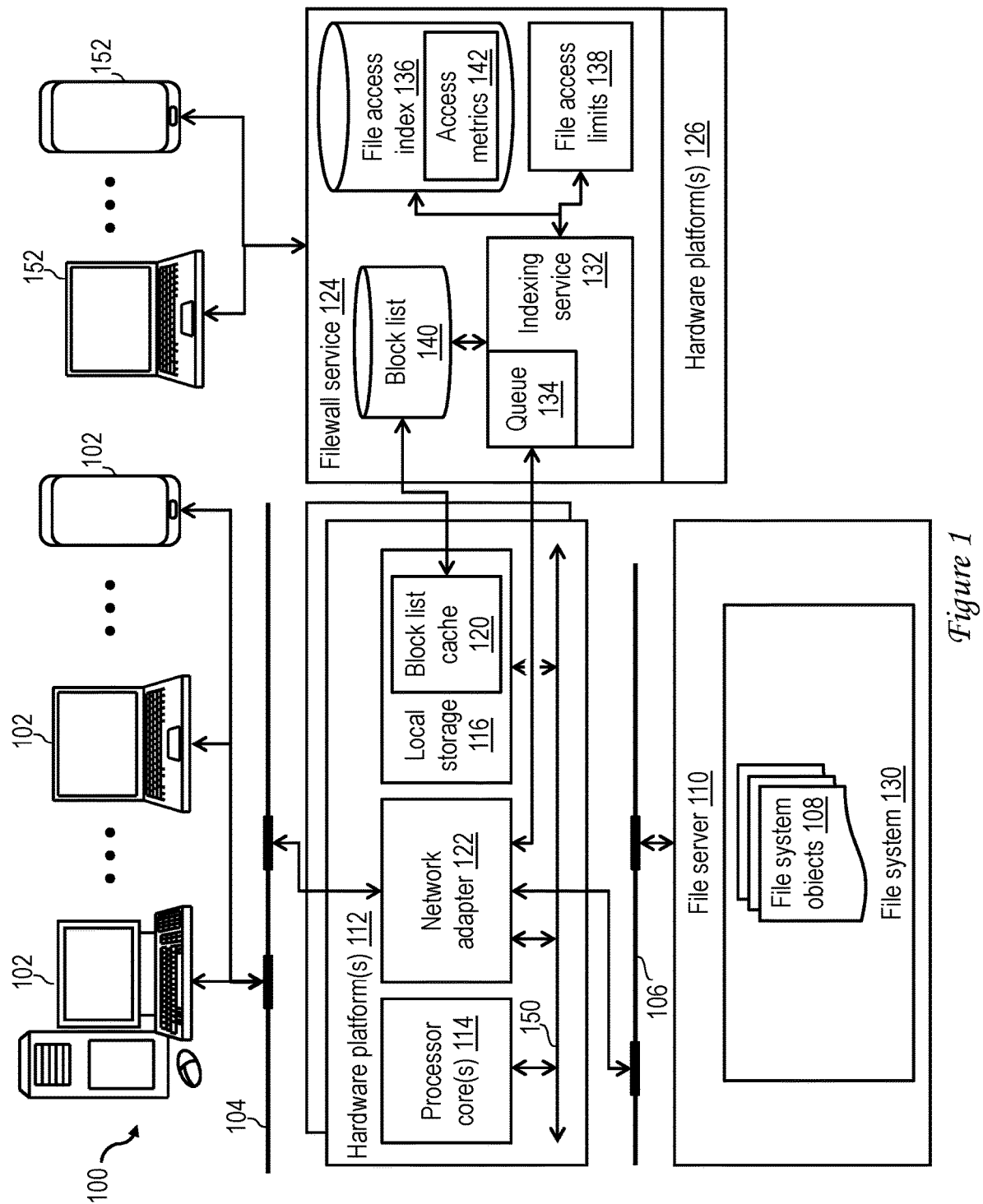
FIG. 1 is a high-level block diagram of an exemplary computing environment in accordance with one embodiment.

With reference now to the figures, in which like reference numerals refer to like and corresponding parts throughout, and in particular with reference to FIG. 1, there is illustrated an exemplary computing environment 100 in which attacks on a file system can be detected, isolated, and mitigated in accordance with the disclosed embodiments. As shown, computing environment 100 includes a file server 110, which implements a file system 130 that stores, organizes, presents, and accesses data organized in the form of various file system objects (FSOs) 108, such as files, folders, and/or directories. In at least some examples, file system 130 can be entirely conventional and may be, for example, Network File System (NFS) Version 4, ZFS, the SSH File System (SSHFS), etc. As those skilled in the art will appreciate, the file system objects 108 of file system 130 can be physically stored locally on file server 110 and/or stored remotely, for example, within a cloud (e.g., a local cloud, remote cloud, or hybrid cloud), network attached storage (NAS), and/or a storage area network (SAN) communicatively coupled to file server 110.

Computing environment 100 additionally includes one or more computing nodes 102 (illustrated generally as various computing devices, such as server computers, desktop computers, laptop computers, tablet computers, mobile phones, etc.), which are coupled for communication with file server 110 (and possibly with each other) via one or more network(s) 104 and 106. Networks 104 and 106 preferably implement layered networking protocols, which in some examples may be compliant with or generally correspond to the well-known seven layer Open Systems Interconnection (OSI) model. The OSI model includes (in ascending order from Layer 1 to Layer 7) physical, data link, network, transport, session, presentation and application layers. In some embodiments, the networking protocols may include, for example, the Internet Protocol suite, which encapsulates protocol data units (PDUs) of higher protocol layers within PDUs of lower protocol layers. In requesting access to files and other file system objects 108 within file system 130, computing nodes 102, functioning in the role of file system clients, issue to file server 110 via networks 104, 106 various different network layer (Layer 3) packets containing commands specifying and/or implying various types of requested file system operations on file system objects, such as open, close, save, delete, etc.

Communicatively coupled between computing nodes 102 and file server 110 is at least one physical hardware platform 112 (and possibly multiple similar hardware platforms 112 implemented in parallel). In some implementations, a hardware platform 112 can be realized as a stand-alone special-purpose data processing system (also referred to as a "hardware appliance"); in other implementations, a hardware platform 112 can be implemented as, or integrated with, another data processing system of computing environment 100, such as a network switch, network router, storage server, web server computer system, storage controller, etc. In the illustrated exemplary embodiment, each hardware platform 112 includes one or more processor cores 114 for processing data and program code, local storage 116 (e.g., volatile and/or non-volatile storage devices) for storing data and program code, and at least one network adapter 122 supporting network communication with computing nodes 102 and file server 110. Processor core(s) 114, local storage 116, and network adapter 122 are all communicatively coupled to a system interconnect 150, which may include, for example, one or more chassis buses and/or switches. In at least some implementations, communication on system interconnect 150 employs different protocol(s) than employed on networks 104, 106, for example, a bus protocol having fewer protocol layers (e.g., only physical and link layers).

As shown, the data stored in local storage 116 of hardware platform 112 includes a block list cache 120 utilized by hardware platform 112 to detect and block network packets belonging to file system attacks targeting file system 130, as described in detail below. At a high level, hardware platform 112 monitors incoming network traffic from computing nodes 102 that is destined for file server 110 to detect file system traffic, for example, Server Message Block (SMB) traffic, Network File System (NFS) traffic, SSH File Transfer Protocol (SFTP) traffic, and/or Object traffic. Hardware platform 112 checks any detected packets of file system traffic against the contents of block list cache 120. If hardware platform 112 detects a match between an incoming packet of file system traffic and an entry in block list cache 120, hardware platform 112 handles the packet to prevent it from initiating an access to file system 130, for example, by refraining from forwarding the matching packet to file server 110.

As further illustrated in FIG. 1, computing environment 100 additionally includes a firewall service 124, which can be implemented, for example, through the execution of suitable program code on one or more hardware platforms 126. Hardware platforms 126 can be implemented with components (e.g., processor core(s) 114, local storage 116, and network adapter 112) similar to those of hardware platform(s) 112. In fact, in some implementations, hardware platform(s) 126 can include one or more of hardware platform(s) 112; in other implementations, hardware platform(s) 126 can be separate and distinct from hardware platform(s) 112. In some cases, hardware platform(s) 126 may be co-located on the same premises as hardware platform(s) 112; in other cases, hardware platform(s) 126 may be located off-premises (e.g., with firewall service 124 being offered as a cloud-based service). Those skilled in the art will further appreciate that firewall service 124 may be executed on hardware platform(s) 126 through one or more intermediate layers of virtualization, such as a container, virtual machine, etc. It should further be understood that a single instance of firewall service 124 can be utilized to control packet filtering by multiple hardware platforms 112.

Firewall service 124 is configured to detect, isolate, and mitigate attacks on the files and other file system objects 108 of file system 130 utilizing an indexing service 132. Indexing service 132 includes a queue 134 into which hardware platform 112 places event messages regarding requested accesses to file system objects 108 that are either directly specified or are implied by network-layer (Layer 3) packets of computing nodes 102 communicated on network(s) 104. Each event message can include, for example, an identifier of a file system object 108 to which access is requested (e.g., a unique filepath to the file system object 108), the access type (e.g., open, save, delete, etc.), the user identifier (ID) to which the access request is attributed, a timestamp specifying the date and time of receipt of the packet, and a status of the access request (e.g., Authorized or Blocked by hardware platform 112). In some cases, the user ID of a file system access request is assigned to an individual human user. In other cases, the user ID may identify a particular hardware device (e.g., Media Access Control (MAC) ID), network address (e.g., Internet Protocol (IP) address), thread ID, process ID, or service ID.

Indexing service 132 processes the event messages in queue 134, substantially in real time, to build a file access index 136. In some examples, file access index 136 may be implemented with a suitable analytics database. File access index 136 provides file access metrics 142 that can be utilized to detect, isolate, and mitigate attacks on file system 130. The file access metrics 142 can categorize and provide counts of file system accesses, for example, by access type, by time period, by user ID(s) (e.g., one or more individual user ID(s), all user ID(s) in a user group, or for all user IDs having permission to access file system 130), by access protocol, etc. As described below, firewall service 124 can compare the file access metrics 142 provided by file access index 136 to file access limits 138 in order to detect and address abnormal file system access patterns. Firewall service 124 can add user IDs contributing to an abnormal file system access pattern to a block list 140. Firewall service 124 then synchronizes block list 140 with the block list cache 120 of each hardware platform 112 to cause hardware platform(s) 112 to temporarily or permanently block network traffic of user IDs contributing to the abnormal file system access pattern detected by filewall service 124.

FIG. 1 further illustrates that filewall server 124 can be communicatively coupled to one or more computing nodes 152 to facilitate administration/configuration of filewall service 124 and visualization of authorized and/or blocked network traffic received by hardware platform(s) 112. In some examples, filewall service 124 may support these administration and visualization functions through an application (app) or browser-based interface executing on computing nodes 152.

Figure 2:
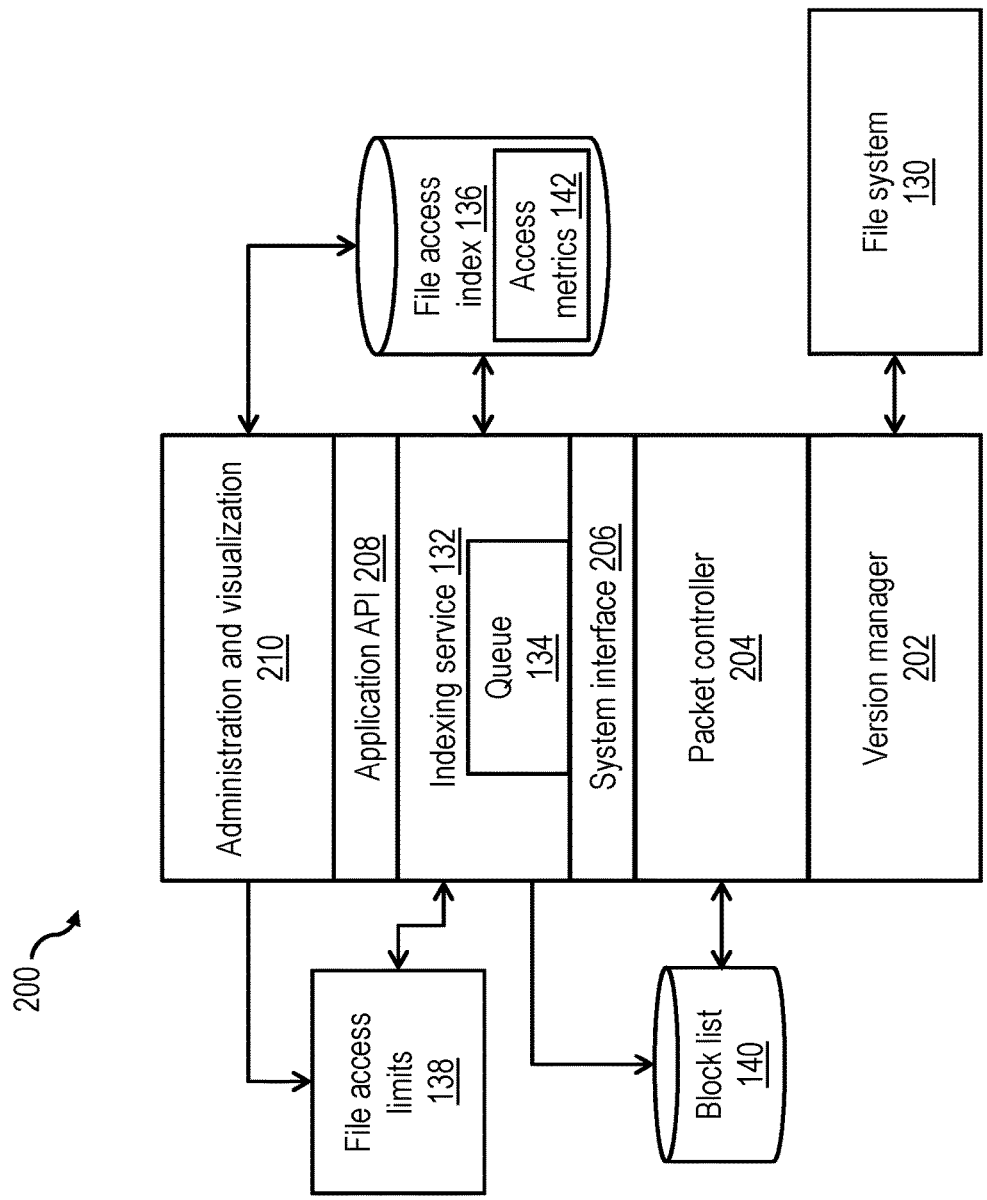
FIG. 2 is a layer diagram illustrating an exemplary software stack that can be utilized to detect, isolate, and mitigate attacks on a file system.

Referring now to FIG. 2, there is depicted a layer diagram illustrating an exemplary software stack 200 that can be utilized to detect, isolate, and mitigate attacks on file system objects 108 in file system 130. As shown, software stack 200 includes, at a lower level, a version manager 202. Version manager 202 can be configured to cause file system 130 to maintain one or more prior versions of each file system object defined by a respective unique file system path (filepath) in file system 130. In various embodiments, version manager 202 can be configured to maintain up to a desired number of versions of each file system object 108 and/or to maintain version(s) within a desired time window of a current timestamp. Although in some embodiments, version manager 202 may capture one or more prior versions of the one or more file system objects 108 on a predetermined versioning schedule (e.g., daily, weekly, and/or monthly), it is currently preferred for version manager 202 to be configured to create a new version of a file system object 108 each time file system 130 receives a "save", "delete", "rename", "move" or other command that modifies the content or attributes (metadata) of a file system object 108. By capturing a version immediately before a potentially destructive change is made to a file system object 108 or its attributes, permanent loss of the "pre-attack" version of the file system object due to an abnormal file access pattern can be avoided. In various implementations, version manager 202 can be implemented on file server 110 (e.g., either integral to or separate from file system 130), on hardware platform(s) 112, or as part of filewall service 124.

Software stack 200 further includes a packet controller 204 implemented on each of hardware platform(s) 112. Packet controller 204 inspects incoming network-layer (Layer 3) packets of file system traffic received by network adapter 122 from computing devices 102 and compares the requesting user ID and/or file path of a requested file system operation. If packet controller 204 determines via block list cache 120 that a match exists in block list 140 for a user ID or filepath specified in a network-layer packet, packet controller 204 blocks access by the user ID to the filepath of the requested file system operation, for example, by discarding the matching packet.

In the depicted embodiment, indexing service 132 interfaces with packet controller 204 via a message-passing system interface 206 through which packet controller 204 populates queue 134 with event messages regarding file system traffic received by network adapter 122 from computing nodes 102. As described above, based on these event messages, indexing service 132 creates a file access index 136 specifying various access metrics 142 characterizing the file system traffic. Indexing service 132 detects abnormal file access patterns in file access index 136 by comparison of access metrics 142 to file access limits 138 and, in response to detection of an abnormal access pattern, enters one or more user IDs contributing to the abnormal file system access pattern and/or one or more filepaths accessed in the abnormal file system access pattern into block list 140.

Software stack 200 may additionally include administration and visualization layer 210 at an upper level. Administration and visualization layer 210 can interface with indexing service 132 via application API 208, for example, to allow a file system administrator utilizing one of computing nodes 152 to access and view the file system accesses maintained in the index 136 and/or to configure file access limits 138.

Figure 3:
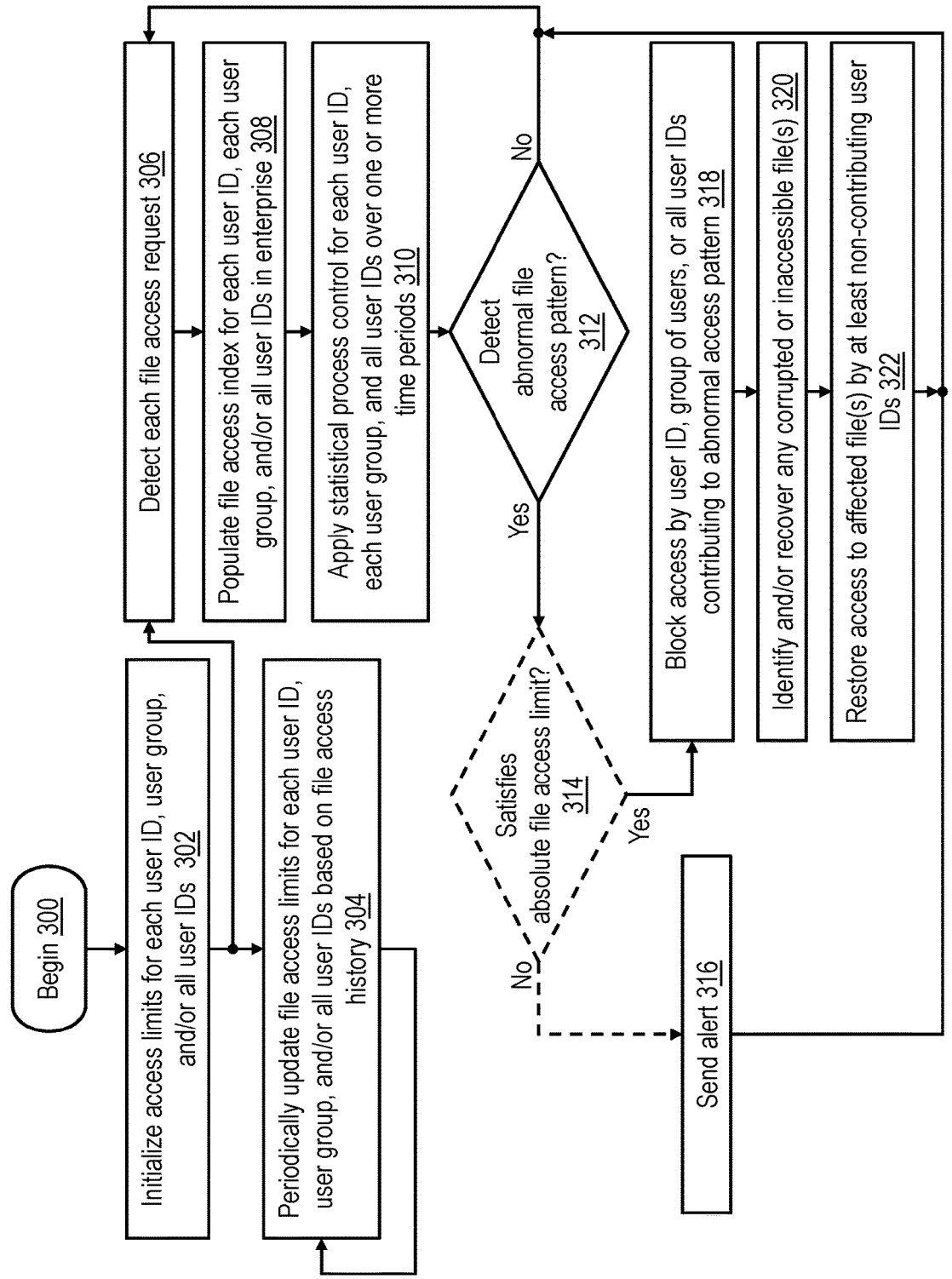
FIG. 3 is a high-level logical flowchart of an exemplary process of detecting, isolating, and mitigating an attack on a file system in accordance with one embodiment.

With reference now to FIG. 3, there is illustrated a high-level logical flowchart of an exemplary process of detecting, isolating, and mitigating an attack on a file system in accordance with one embodiment. The process of FIG. 3 can be performed, for example, by one or more processor cores 114 of hardware platform(s) 112, 126 through the execution of suitable program code, for example, the program code implementing software stack 200. The disclosed process can be effective against various kinds of file system attacks, including attacks by malicious software, human actors, and/or compromised Internet-connected devices (bots).

The process of FIG. 3 begins at block 300 and then proceeds to block 302, which illustrates initialization of file access limits 138 (see, e.g., FIGS. 1 and 2) for each user ID, user group of one or more user IDs, and/or all user IDs in the enterprise authorized to access files and other file system objects via file system 130. In some embodiments, the file access limits 138 can include an alert limit specifying a number of file accesses within one or more observation intervals (e.g., hour, shift duration, day, week, month, etc.) that will cause an alert (e.g., to one or more users, a file system administrator, an enterprise administrator, etc.) to be generated. File access limits 138 can also include one or more absolute limits specifying a maximum number of file accesses that can be made in one or more given observation intervals. In some embodiments, the initial file access limits 138 may be established by a file system administrator or by indexing service 132, for example, utilizing default values. In other embodiments, the initial file access limits 138 may be established by indexing service 132 based on the observed file system access history recorded in file access index 136. Indexing service 132 may establish the file access limits 138 based on the mean number of accesses for each user ID, user group, or all user IDs in the enterprise over one or more observation periods (e.g., last day, last week, last month, etc.). The file access limits 138 may additionally specify different file system access limits (e.g., alert limits and/or absolute limits) for different types of file system access (e.g., opens, reads, writes, deletes, or all accesses).

Figure 4:
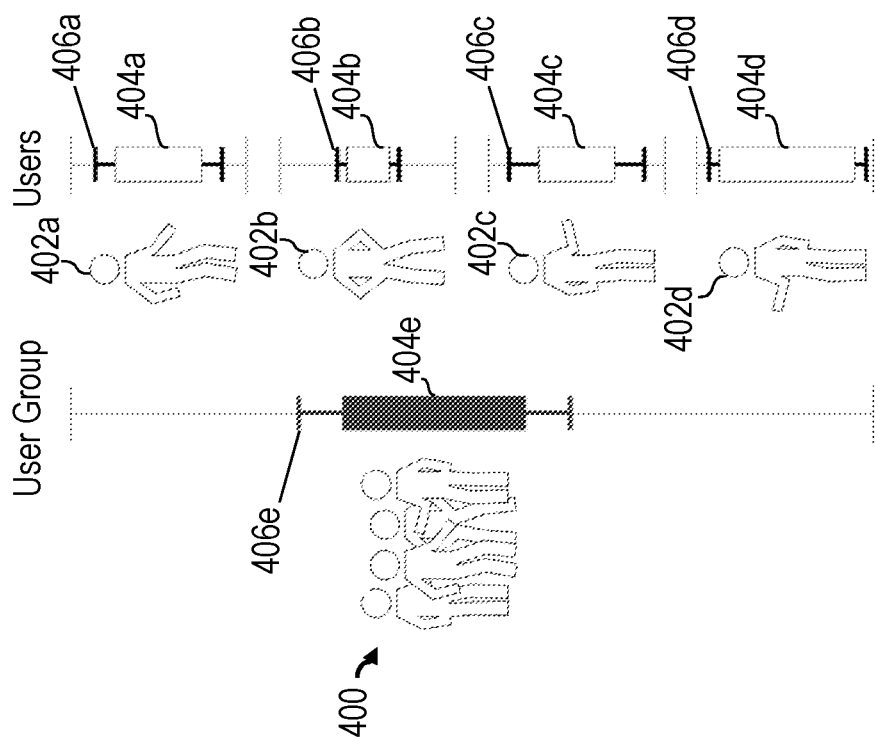
FIG. 4 is a block diagram illustrating file access metrics determined for users and user groups in accordance with one embodiment.

FIG. 4 illustrates one example of the implementation of file access limits 138 by indexing service 132 for an enterprise including a user group 400 including users 402a-402d. In this example, indexing service 132 determines a number of file system accesses (e.g., of a given type or for all types) for the user IDs corresponding to each of users 402a-402d over one or more observation intervals (e.g., one or more days) during an observation period and records the file system accesses as access metrics 142. As indicated, the user ID of each of users 402a-402d will have a respective range of access counts 404a-404d representing a "normal" pattern of file system accesses by the corresponding user that is not attributable to an attack by malware, human actors, or bots. Based on the observed range of access counts, indexing service 132 can then determine a respective suitable individual file system access limit 406a-406d for the user ID assigned to each of users 402a-402d (for all file system access types and/or for particular file system access types). For example, in one embodiment, indexing service 132 determines a respective mathematical mean of the file system access counts represented by each of ranges 404a-404d and then sets the corresponding one of file system access limits 406a-406d as a predetermined number of standard deviations (e.g., 2) above the mean. As further illustrated in FIG. 4, indexing service 132 can similarly determine a file system access limit 406e for user group 400 (and/or for all user IDs in the enterprise) based on a range of access counts 404e attributable to the user IDs of all of users 402a-402d during observation intervals in the observation period. Indexing service 132 may employ this technique to determine both alert limits and absolute limits, with the absolute limits typically being set at a greater standard deviation from the relevant mean of file access counts than the alert limits.

Returning to FIG. 3, following block 302 the process bifurcates and then proceeds in parallel to blocks 304 and 306. Block 304 illustrates indexing service 132 periodically updating the file access limits 138 for each user ID, user group, and/or all user IDs in the enterprise based on the file access history provided by file access index 136. For example, indexing service 132 may update the file access limits 138 for each user ID, user group, and/or all user IDs in an enterprise once per update period, which can be the same as, or shorter or longer than, the observation period. For example, in some embodiments, the update period can be once per calendar month.

Figure 5:
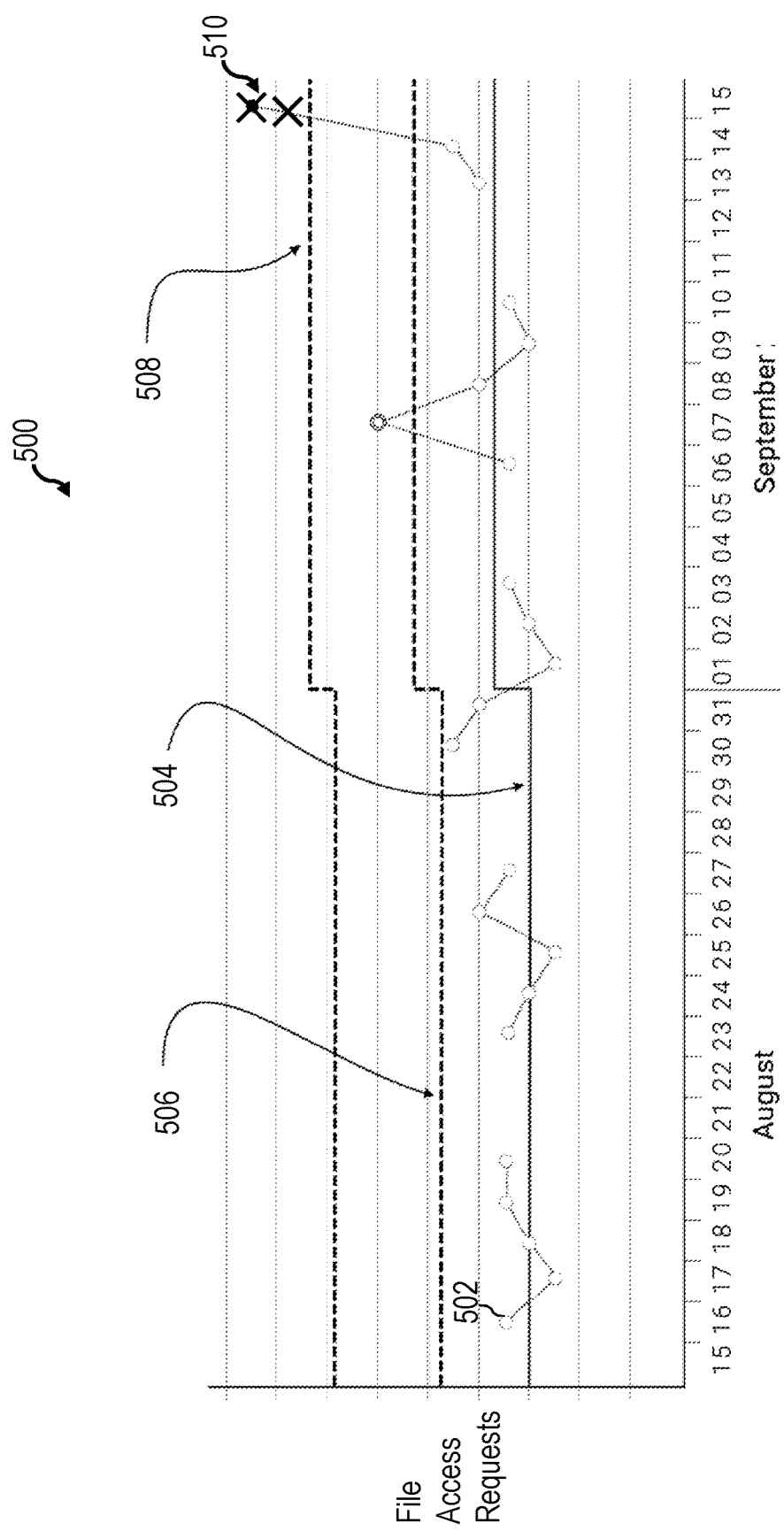
FIG. 5 is a timing diagram illustrating an update to the file access limits for a user or user group in accordance with one embodiment.

FIG. 5 is a timing diagram 500 that illustrates an update to file access limits 138 for a user ID or user group over time in accordance with one embodiment. In this example, a user ID or user group initiates a given aggregate number of a file system access requests per day (i.e., observation interval) to file system 130, which are recorded by indexing service 132 in file access index 136 as represented in FIG. 5 by data points 502. Days on which no file system accesses were initiated by the user ID or user group (e.g., weekend days) have no associated data points 502 illustrated in FIG. 5. Based on the daily file system access counts, indexing service 132 computes a mean 504 over the observation period. In this example, indexing service 132 updates mean 504 once per month (i.e., the update period), for example, at the beginning of the month. On the same schedule, indexing service 132 can also update an alert limit 506, which, if exceeded, triggers an alert, and/or an absolute limit 508 above which firewall service 124 causes file system access requests to be rejected, as indicated at reference numeral 510.

Referring now to blocks 306-312 of FIG. 3, indexing service 132 monitors network-layer (Layer 3) traffic to detect an abnormal file system access pattern. In the depicted example, indexing service 132 detects each file system access request made by computing nodes 102 to file system 130 by reference to the event messages in queue 134 (block 306). Based on these event messages, indexing service 132 populates file access index 136 with access metrics 142 for each user ID, each user group, and/or all user IDs in the enterprise substantially in real time, as discussed above (block 308). Indexing service 132 additionally applies statistical process control for each user ID, each group, and/or all user IDs in the enterprise over one or more time periods (block 310). As described above, this statistical process control can include establishing and monitoring one or more file access limits 138 (e.g., alert limits and absolute limits) based on historical file access patterns. At block 312, indexing service 132 determines, utilizing the statistical process control implemented at block 310 and the event messages received in queue 134, whether or not an abnormal file access pattern directed to file system 130 is detected. For example, at block 312 indexing service 132 may determine whether a number of file system access requests initiated by a particular user ID, a user group, and/or all user IDs in the current observation interval satisfies (e.g., is greater than or equal to) one or more of file access limits 138. If not, the process of FIG. 3 returns to block 306, which has been described.

If, however, indexing service 132 determines at block 312 that an abnormal file access pattern has been detected, indexing service 132 determines if action is to be taken to isolate and mitigate an attack on file system 130. For example, in embodiments in which distinct alert limits and absolute limits are implemented, the process may proceed to optional block 314. Optional block 314 illustrates indexing service 132 specifically determining whether or not a network packet that specifies or implies a file system access request that causes an alert limit to be satisfied also causes an absolute file access limit to be satisfied. In response to a negative determination at optional block 314, the process proceeds to block 316, which illustrates indexing service 132 sending an alert to an enterprise administrator and/or the user ID or user group whose alert limit was satisfied. Thereafter, the process of FIG. 3 returns to block 306.

In response to affirmative determinations at both of blocks 312-314 (or if an affirmative determination is made at block 312 and optional block 314 is omitted), the process of FIG. 3 proceeds to block 318, which illustrates firewall service 124 taking action to isolate a detected attack on file system 130. For example, at block 318, indexing service 132 may cause file system 130 to temporarily block access to all file system objects 108 by the individual user ID, user group, and/or all enterprise user IDs contributing to the abnormal file system access pattern that was detected at blocks 312-314, for example, by adding the relevant user IDs to block list 140. The user ID(s) for which the file access limit was satisfied are referred to herein as the "contributing user ID(s)."

In at least some embodiments, firewall service 124 can implement a plurality of different alternative actions to block access to file system objects 108 by contributing user ID(s) and, in some implementations, the blocking actions and the notification, if any, provided to the contributing user ID(s) can be configurable. In some cases the blocking actions and the notification to the contributing user ID(s) can be based on the signature of the abnormal file access pattern, including the types and frequency of file system access requests, the requested file system objects, the number of contributing user ID(s), etc. For example, for an abnormal file access pattern having N or more contributing user IDs (N being a configurable integer greater than 1) that, in aggregate, exceed a read access limit, firewall service 124 may simply cause subsequent file system access requests of the contributing user IDs to be denied and explicitly notify the requesting user IDs of each denial in an access denied notification presented by a file system browser (e.g., "Access Denied" and/or an audible tone). In other cases, firewall service 124 may cause subsequent file system access requests by the contributing user ID(s) to be denied and cause the file system browser or OS to present a file system busy notification such as a textual message or graphical progress indicator (e.g., a Windows wait cursor or the like). It should be noted that, in this case, the file system busy notification is intentionally misleading and may create a delay sufficient to allow on-site security personnel to locate and detain the perpetrator of an attack. As another example, in the case of a contributing user ID attempting to make an unauthorized exfiltration of file system objects 108, firewall service 124 may cause the file system browser to present a misleading success notification while preventing file system 130 from copying at least some of the requested file system objects 108 to the target storage device. In this case, firewall service 124 may also cause file system 130 to store dummy file system objects, encrypted (and unencryptable) file system objects, and/or malware (e.g., a virus, tracking or monitoring code, ransomware, etc.) on the target storage device.

At block 318, indexing service 132 may alternatively or additionally add to block list 140 the respective filepath of one or more file system objects 108 that were accessed in the abnormal file system access pattern, as recorded in file access index 136. Indexing service 132 propagates the addition of these blocked user IDs and/or blocked filepaths to each block list cache 120, which causes packet controller 204 to thereafter block network layer packets specifying the blocked user IDs and/or specifying or implying an access to the blocked filepath(s). As will be appreciated, suspension of access to file system object(s) 108 by the contributing user IDs helps limit the scope of impact of the attack (e.g., replication of the virus, unauthorized encryption, copying, or publication of files, etc.) until the attack can be addressed. In addition, suspension of access by non-contributing user IDs to the filepath(s) recently accessed in the attack, which are potentially infected or affected by the attack, helps limit the scope of impact of the attack.

In at least some embodiments, firewall service 124 additionally takes action to remediate the detected attack (block 320). For example, at block 320, indexing service 132 may notify file system 130, a user or user group, and/or a system administrator of the detection of the attack and identify recently accessed files that are potentially the subject of or affected by the attack. Further, firewall service 124 may initiate the recovery of one or more corrupted file system objects 108. For example, indexing service 132 may request version manager 202 to initiate reversion of one or more file system objects 108 accessed by the contributing user IDs during the attack to a prior version of the one or more file system objects 108 having a last modification timestamp prior to onset of the attack. Following block 320, firewall service 124 restores access to the recovered file system objects 108 by at least the non-contributing user ID(s) by removing the filepath(s) to the affected file system objects 108 from block list 140 and each block list cache 120 (block 322). At block 322, firewall service 124 may also implement a quorum requirement to restore file system access to contributing user ID(s). For example, in one implementation of a quorum requirement, authorizations by multiple users having greater than a threshold level of authority are required to remove contributing user ID(s) from block list 140. The quorum requirement advantageously prevents a single user from perpetrating an attack and then removing the user's own user ID from block list 140. Following block 322, the process of FIG. 3 returns to block 306 and continues iteratively.

As has been described, techniques are disclosed to detect, isolate, and/or mitigate an attack on a file system by malicious software, human actors, and/or compromised Internet-connected devices (bots). A processor of a data processing system detects an abnormal file system access pattern by applying statistical process control. The abnormal file system access pattern can be detected based on network-layer (Layer 3) traffic including commands specifying or implying various types of file system access. Based on detecting the abnormal file system access pattern, the processor temporarily suspends file system access by at least one user ID contributing to the abnormal file system access pattern. The processor can also provide a notification identifying one or more file system objects accessed in the abnormal file system access pattern.

In the disclosed embodiments, the file system protection provided by firewall service 124 is transparent to computing nodes 102. Firewall service 124 resides neither at the clients (e.g., computing nodes 102) nor at the network endpoints (e.g., on the networked storage devices), but is instead interposed in the network data path between the clients and storage resources. As such, firewall service 124 can interdict, in substantially real time, file system attacks of various kinds.

The present invention may be implemented as a method, a system, and/or a computer program product. The computer program product may include a storage device having computer readable program instructions (program code) thereon for causing a processor to carry out aspects of the present invention. As employed herein, a "storage device" is specifically defined to include only statutory articles of manufacture and to exclude signal media per se, transitory propagating signals per se, and energy per se.

Aspects of the present invention are described herein with reference to flowchart illustrations and/or block diagrams that illustrate the architecture, functionality, and operation of possible implementations of systems, methods, and computer program products according to various embodiments. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will be understood that each block of the block diagrams and/or flowcharts and combinations of blocks in the block diagrams and/or flowcharts can be implemented by special purpose hardware-based systems and/or program code that perform the specified functions. While the present invention has been particularly shown as described with reference to one or more preferred embodiments, it will be understood by those skilled in the art that various changes in form and detail may be made therein without departing from the spirit and scope of the invention.

The figures described above and the written description of specific structures and functions are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of data processing in a data processing system including a processor, the method comprising:
    a processor establishing, for a user ID, a time-based file system access limit applicable to file system access requests attributed to the user ID and directed to a file system;
    the processor detecting, within network layer packets communicated on a communication network, an abnormal file system access pattern directed to the file system, wherein the detecting includes comparing, to the time-based file system access limit, a number of file system access requests in the network layer packets of a given file system protocol that are attributed to the user ID and that are observed within an observation interval;
    based on detecting the abnormal file system access pattern, the processor temporarily suspending, at the network layer, file system access by the user ID contributing to the abnormal file system access pattern; and
    the processor providing a notification identifying one or more file system objects accessed in the abnormal file system access pattern.

2. The method of claim 1, wherein establishing the time-based file system access limit includes setting the file system access limit based on an observed number of file system access requests attributed to the user ID during each of one or more prior observation intervals.

3. The method of claim 1, further comprising:
    the processor periodically updating the time-based file system access limit based on changing file system access patterns attributed to the user ID.

4. The method of claim 1, further comprising:
    building a file access index characterizing file system traffic based on file system access requests in network layer packets that are attributed to one or more user IDs including the user ID;
    wherein the comparing includes referencing the file access index.

5. The method of claim 1, further comprising:
    based on detecting the abnormal file system access pattern, the processor temporarily suspending file system access by the user ID to the file system through handling of network layer packets attributed to the user ID.

6. The method of claim 1, further comprising:
    based on detecting the abnormal file system access pattern, the processor recovering at least one file system object recently accessed by the user ID by reverting to a prior version of the at least one file system object.

7. A data processing system, comprising:
    a processor; and
    a storage device coupled to the processor, wherein the storage device includes program code executable by the processor core that causes the data processing system to perform:
        establishing, for a user ID, a time-based file system access limit applicable to file system access requests attributed to the user ID and directed to a file system;
        detecting, within network layer packets communicated on a communication network, an abnormal file system access pattern directed to the file system, wherein the detecting includes comparing, to the time-based file system access limit, a number of file system access requests in the network layer packets of a given file system protocol that are attributed to the user ID and that are observed within an observation interval;
        based on detecting the abnormal file system access pattern, temporarily suspending, at the network layer, file system access by the user ID contributing to the abnormal file system access pattern; and
        providing a notification identifying one or more file system objects accessed in the abnormal file system access pattern.

8. The data processing system of claim 7, wherein establishing the time-based file system access limit includes setting the file system access limit based on an observed number of file system access requests attributed to the user ID during each of one or more prior observation intervals.

9. The data processing system of claim 7, wherein the program code further causes the data processing system to perform:
    periodically updating the time-based file system access limit based on changing file system access patterns attributed to the user ID.

10. The data processing system of claim 7, wherein the program code further causes the data processing system to perform:
    building a file access index characterizing file system traffic based on file system access requests in network layer packets that are attributed to of one or more user IDs including the user ID;
    wherein the comparing includes referencing the file access index.

11. The data processing system of claim 7, wherein the program code further causes the data processing system to perform:
    based on detecting the abnormal file system access pattern, temporarily suspending file system access by the user ID to the file system through handling of network layer packets attributed to the user ID.

12. The data processing system of claim 7, wherein the program code further causes the processor to perform:
    based on detecting the abnormal file system access pattern, recovering at least one file system object recently accessed by the user ID by reverting to a prior version of the at least one file system object.

13. A program product, comprising:
    a storage device; and
    program code, stored within the storage device, which when executed by a processor of a data processing system serving a source host causes the data processing system to perform:
        establishing, for a user ID, a time-based file system access limit applicable to file system access requests attributed to the user ID and directed to a file system;
        detecting, within network layer packets communicated on a communication network, an abnormal file system access pattern directed to the file system, wherein the detecting includes comparing, to the time-based file system access limit, a number of file system access requests in the network layer packets of a given file system protocol that are attributed to the user ID and that are observed within an observation interval;
        based on detecting the abnormal file system access pattern, temporarily suspending, at the network layer, file system access by the user ID contributing to the abnormal file system access pattern; and providing a notification identifying one or more file system objects accessed in the abnormal file system access pattern.

14. The program product of claim 13, wherein establishing the time-based file system access limit includes setting the file system access limit based on an observed number of file system access requests attributed to the user ID during each of one or more prior observation intervals.

15. The program product of claim 13, wherein the program code further causes the data processing system to perform:
periodically updating the time-based file system access limit based on changing file system access patterns attributed to the user ID.

16. The program product of claim 13, wherein the program code further causes the data processing system to perform:
building a file access index characterizing file system traffic based on file system access requests in network layer packets that are attributed to one or more user IDs including the user ID;
wherein the comparing includes referencing the file access index.

17. The data processing system of claim 13, wherein the program code further causes the data processing system to perform:
based on detecting the abnormal file system access pattern, temporarily suspending file system access by the user ID to the file system through handling of network layer packets attributed to the user ID.

18. The data processing system of claim 13, wherein the program code further causes the data processing system to perform:
based on detecting the abnormal file system access pattern, recovering at least one file system object recently accessed by the user ID by reverting to a prior version of the at least one file system object.

19. The method of claim 1, further comprising:
based on detecting the abnormal file system access pattern, the processor temporarily suspending file system access to one or more file system objects recently accessed by the user ID.

20. The method of claim 1, wherein the detecting includes detecting at a hardware platform interposed in the communication network between a computing node associated with the user ID and a file server hosting the file system.

21. The method of claim 5, wherein temporarily suspending file system access by the user ID includes the processor refraining from communicating file system access requests attributed to the user ID to the file system.

22. The method of claim 21, wherein the refraining includes the processor discarding network layer packets that include file system access requests attributed to the user ID.

23. The method of claim 1, wherein the file system protocol is one of the following: Server Message Block (SMB), Network File System (NFS), and SSH File Transfer Protocol (SFTP).

* * * * *